US008737290B2

(12) United States Patent
Veschi et al.

(10) Patent No.: US 8,737,290 B2
(45) Date of Patent: May 27, 2014

(54) PERFORMANCE ENHANCEMENT PROTOCOL, SYSTEMS, METHODS AND DEVICES

(75) Inventors: Robert Allen Veschi, Wesley Chapel, FL (US); Haysam Rachid, Tampa, FL (US)

(73) Assignee: EdgeAccess, Inc., Odessa, FL (US)

( * ) Notice: Subject to any disclaimer, the term of this patent is extended or adjusted under 35 U.S.C. 154(b) by 1216 days.

(21) Appl. No.: 11/202,169

(22) Filed: Aug. 12, 2005

(65) Prior Publication Data

US 2007/0036142 A1 Feb. 15, 2007

(51) Int. Cl.
*H04B 7/185* (2006.01)

(52) U.S. Cl.
USPC .............................. 370/316; 370/352; 370/356

(58) Field of Classification Search
USPC .......................................... 370/356, 316, 352
See application file for complete search history.

(56) References Cited

U.S. PATENT DOCUMENTS

| 5,526,353 | A | 6/1996 | Henley et al. | |
|---|---|---|---|---|
| 6,389,038 | B1 * | 5/2002 | Goldberg et al. | 370/471 |
| 6,415,329 | B1 * | 7/2002 | Gelman et al. | 709/245 |
| 2003/0202506 | A1 | 10/2003 | Perkins et al. | |
| 2004/0022237 | A1 * | 2/2004 | Elliott et al. | 370/356 |
| 2004/0139209 | A1 * | 7/2004 | Mussman et al. | 709/230 |
| 2004/0199649 | A1 | 10/2004 | Tarnanen et al. | |
| 2005/0232180 | A1 * | 10/2005 | Toporek et al. | 370/316 |

FOREIGN PATENT DOCUMENTS

TW 574812 2/2004

OTHER PUBLICATIONS

International Search Report and Written Opinion mailed on Aug. 24, 2007 in International Application No. PCT/US2006/030285.
"Voice PEP is Now Here!", EdgeAccess news release, Mar. 23, 2005 [1 pg.].
"vPEP Voice Performance Enhancement Proxy", EdgeAccess brochure, about Mar. 2005 [1 pg.].
"vPEP(TM) Satellite Economics", PowerPoint slide presentation, EdgeAccess, presented Jan. 2005 at PTC in Honolulu, HI, and Mar. 2005 at Satellite 2005, Washington, DC [31 pgs.].
Malaysian Patent Appln. No. PI20063875—Nov. 13, 2009 Malaysian IPO Substantive Examination Adverse Report.
Taiwan (ROC) Appln. No. 95129375, Official Letter with with full English translation, Taiwan Patent and Trademark Office, Nov. 28, 2012 [11 pages].
Malaysian Patent Appln. No. PI20063875, Substantive Examination Adverse Report, Malaysian Intellectual Property Office, Jul. 31, 2012 [6 pages].
Taiwan (ROC) Appln. No. 95129375, Official Letter with Search Report and English translation of Search Report, Taiwan Patent and Trademark Office, Nov. 28, 2012 [8 pages].
Intellectual Property Corporation of Malaysia, Substantive Examination Adverse Report, Aug., 13, 2013, for Malaysian Patent Application No. PI 20063875 [6 pgs.].

* cited by examiner

*Primary Examiner* — Asad Nawaz
*Assistant Examiner* — Najeebuddin Ansari
(74) *Attorney, Agent, or Firm* — Siritzky Law, PLLC (57) ABSTRACT

A method, operative in a framework which uses a packet-based voice communications scheme and in which at least some of the communication takes place via a satellite link. The method includes establishing a first session between a calling party and proxy using a first protocol, wherein the calling party communicates with the proxy via the satellite link; and establishing a second session between the proxy and a called party using a second protocol distinct from the first protocol, and providing communications from the calling party to the second party and from the second party to the first party.

22 Claims, 12 Drawing Sheets

PERFORMANCE ENHANCEMENT PROTOCOL, SYSTEMS, METHODS AND DEVICES

FIELD OF THE INVENTION

This invention relates to communications, and, more particularly, to systems, methods, devices and related protocols to improve the performance and efficiency of high-speed media applications, such as Voice-over-IP, by optimizing bandwidth.

BRIEF DESCRIPTION OF THE DRAWINGS

The invention is better understood by reading the following detailed description with reference to the accompanying drawings in which.

DETAILED DESCRIPTION OF PRESENTLY PREFERRED EXEMPLARY EMBODIMENTS

Background and Overview

Historically, circuit-switched technology has been used to transport telephone calls. Classical circuit-switched technology, while still widely used, has certain inherent limitations. For one, this technology effectively established a permanent (or persistent) connection between the calling and the called parties for the entire duration of the call, thus requiring a significant amount of bandwidth dedicated to each call. Additionally, classic circuit-switched technology can only support certain types of calls, in particular, telephone to telephone. The network used by traditional telephone companies is referred to as the Public Switched Telephone Network (PSTN)—the PSTN provides voice and data communication over a circuit-switched network. It is the network which presently provides most telephone service to end users.

To avoid the overhead and limitations (economic, regulatory, physical and other) imposed by the PSTN, many traditional telephone companies along with many startup entities have started to use the Internet infrastructure to connect calls. This type of service—one which transports voice, video, text, and other real-time media over Internet Protocol ("IP") networks—is generally referred to as IP Telephony ("IPTel") or voice over IP ("VoIP"). VoIP refers to transporting voice communication (i.e., "telephone calls") over IP networks, such as the Internet. As used herein, the term VoIP is used synonymously with the more general term IP Telephony (IP-Tel). That is, as used herein, VoIP is not limited to voice communications, and may include voice, video, text and other real-time media. VoIP generally refers to calls that traverse IP networks such as the Internet. This may mean that the calls are going over an IP network such as the Internet, or it may mean calls are traveling over privately managed data networks that are using IP to transport the calls from one location to the other. (The Internet Protocol, in addition to being used on the Internet, is presently the most widely used packet-switched communication protocol used to transport information between computer systems.)

In general terms, for VoIP calls, the voice stream is broken down into packets which are compressed and sent to their final destination by various routes. Unlike the classical PSTN, no permanent or persistent connection need be established for the duration of a VoIP call. Once received at their ultimate destination, the packets are reassembled, decompressed, and converted back into a voice stream.

Figure 1:
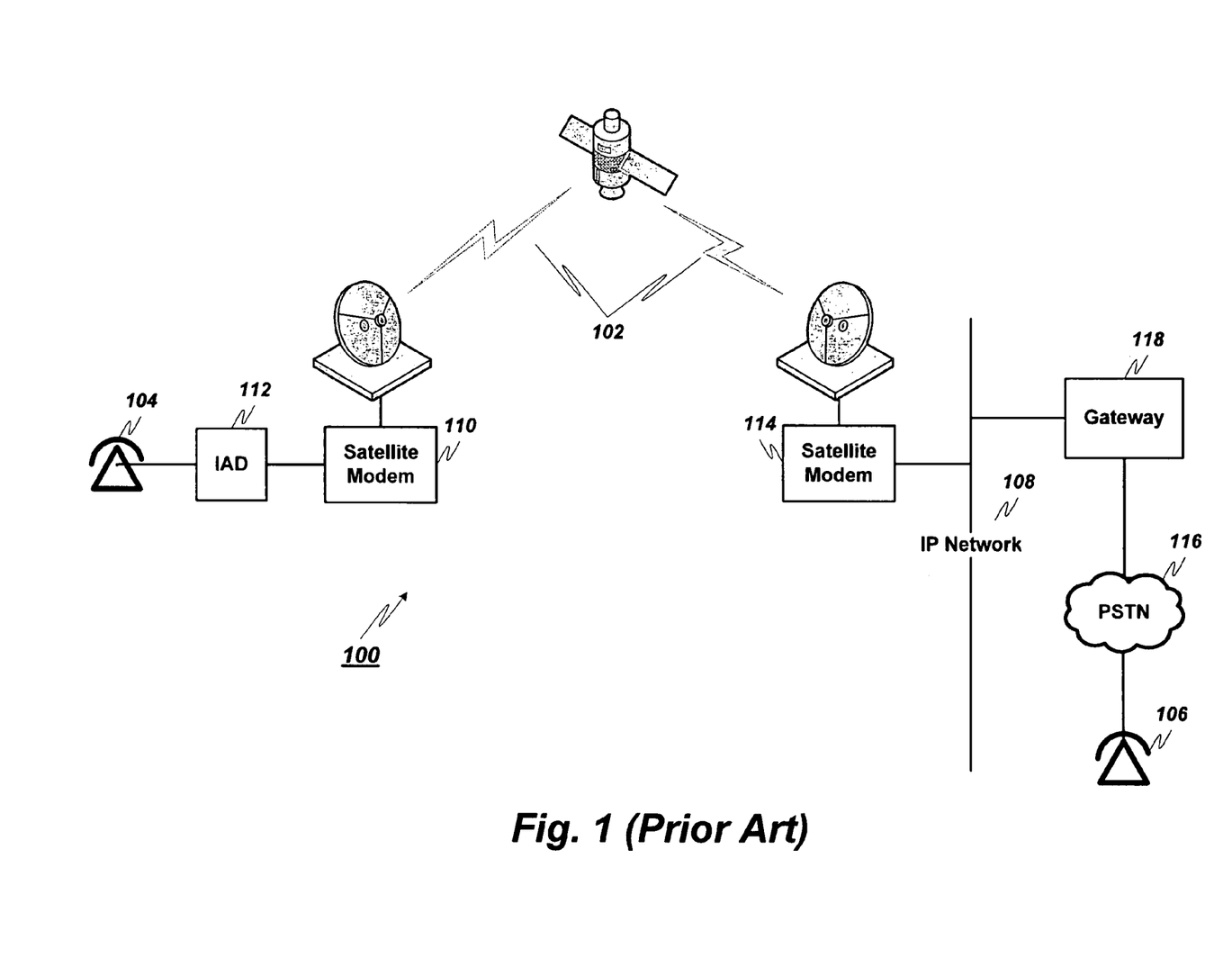
FIGS. 1 and 2 describe the operation of a satellite-based telephone system.

FIG. 1 depicts a typical VoIP system/framework 100 that uses a satellite link 102 to connect a first telephone 104 to a second (remote) telephone In general, an IAD is a device enables integration of voice, data and Internet and associated managed services, like VoIP, over a single wide area network (WAN) network connection. An IAD can also serve as an analog gateway, bridging between an IP network and a PBX (Private Branch eXchange) or PSTN.

Although described as a "telephone," the first telephone 104 may be personal computer or any other type of device that may be used to send and receive voice data using the VoIP system 100. Those skilled in the art will realize that the IAD 112 may be incorporated into the phone 104 or into the satellite modem 110.

On the other end of the satellite link 102, a second satellite modem connects to the IP network 108. Data from the IP network 108 may be provided to the PSTN 116 via a gateway 118. As is well known in the art, a gateway is a device that is used to connect one type of network to another. For example, as shown here, a gateway is used to connect the legacy PSTN network 116 to the IP network 108. In general terms, the gateway's responsibility is to provide signaling inter-working, as well as transforming information from one network into a format that is suitable for the other network.

Figure 2:
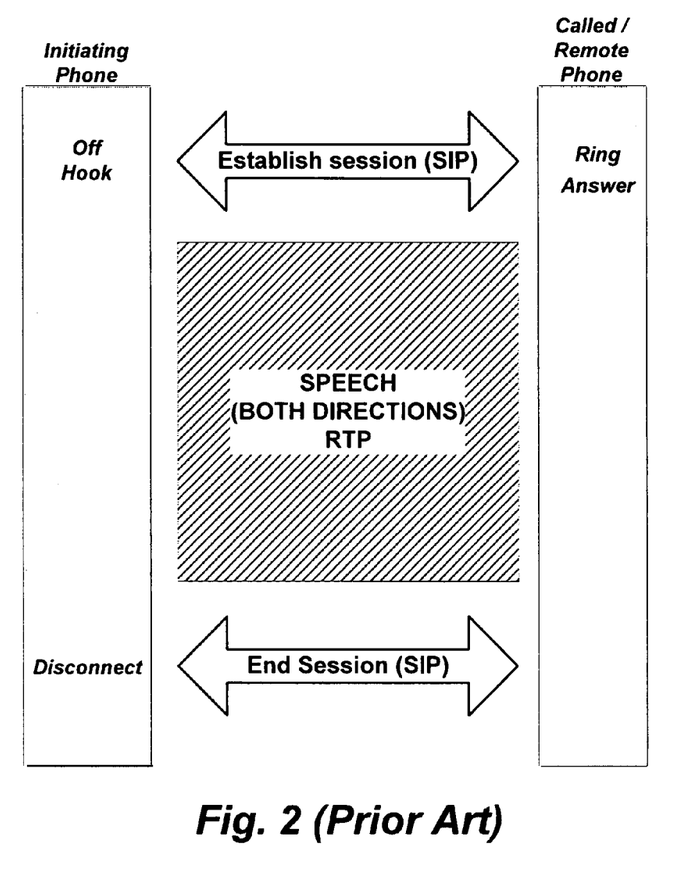

A typical phone call, using the framework shown in FIG. 1, works as follows (with reference to FIG. 2): The user at the initiating phone (phone 104 in this case) lifts the phone off the hook and dials a telephone number corresponding to the second phone (phone 106) (or performs some equivalent function using a computer in order to try to connect to the second phone 106). This causes the system to try to establish a connection between the two phones. The most commonly used protocol to establish such connections is called SIP (Session Initiation Protocol), defined by the IETF, and those skilled in the art know how SIP operates in VoIP frameworks. Those skilled in the art will realize that SIP is used as an exemplary protocol, and that other suitable protocols may be used and are considered within the scope of the invention. For example, without limitation, other VoIP signaling protocols such as MGCP (Media Gateway Controller Program) and H.323 may be used.

Once a session has been established between the two phones, bi-directional speech may begin. Because the speech will traverse one or more digital networks, the actual voice data are first converted from analog to digital form. This A-D conversion may take place within the phone (or computer), or it may be performed by an external adaptor such as the IAD 112. Once in digital form, the data are then compressed (e.g., using a real-time protocol such as RTP over UDP over IP), put into packets, and sent over the network to their destination. In the case of a framework that includes a satellite-based link (such as shown in FIG. 1), the packets are converted into appropriate form by the satellite modem 110, and the sent via the satellite link 102 to the satellite modem 114. The receiving satellite modem 114 converts the packets back to an appropriate form and sends them out on the IP network 108. In the example framework shown, to reach the second phone 106, the packets traverse the gateway 118 and PSTN 116. At some point prior to reaching the second phone, the data packets must be put in the correct order and unpacked. Their payload data must be uncompressed and converted back to analog form. In the case shown, the gateway 118 will likely perform some of these functions.

In summary, VoIP works by digitalizing voice into data packets, sending those packets, and reconverting them into voice at their destination. In order to control the communication of packets in a packet-based network (such as a TCP/IP network), and in order to navigate such a network to a destination, each packet must contain certain address and other control information. This is stored in a so-called packet header. The actual data in a packet—its payload—are typically stored separately from its header. VoIP uses the header to navigate the network to its destination. The payload carries bits of the conversation.

In VoIP frameworks such as that shown in FIG. 1, voice travels as a so-called UDP (User Datagram Protocol) packet. UDP is a connectionless transport layer protocol in the TCP/IP protocol stack. UDP is a simple protocol that exchanges datagrams without acknowledgments or guaranteed delivery, requiring that error processing and retransmission be handled by other protocols. A datagram is the term used to describe data that are packetized for network transport. In essence, UDP is a communications protocol that, like TCP, runs on top of IP networks. UDP is used primarily for broadcasting messages over a network. UDP uses the Internet Protocol to get data from one computer or device to another but does not divide a message into sequenced packets nor reassemble it at the other end.

Figure 3:
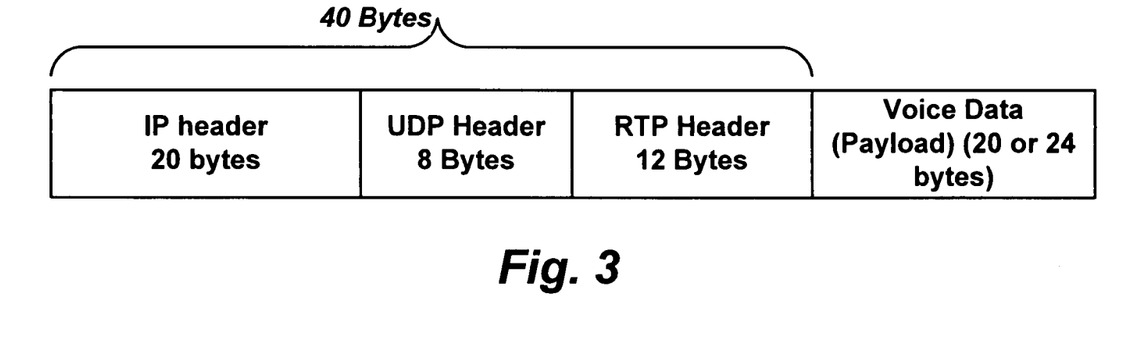
FIG. 3 depicts the layout of a typical packet.

FIG. 3 shows the logical format of a typical UDP/IP packet containing a payload of voice data. In the example shown in the drawing, which is typical of TCP/IP networks today, the packet header is made up of 40 bytes of header data: a 20-byte IP header, an 8-byte UDP header and a 12-byte RTP header. Those of skill in the art will understand that the size of the actual payload in these packets depends on the voice compression scheme/algorithm used by the system. For some embodiments, the payload may be 20 or 40 bytes. The algorithm used to compress/decompress speech or audio signals in a VoIP is referred to as a codec. Typical and presently widely used voice codecs in VoIP systems include g.723.1, g.711 and g.729, each of which define compression techniques that can be used for compressing speech or audio signal components at a very low bit rate, as part of the H.324 family of standards. The g.723.1 codec has two bit rates associated with it: 5.3 and 6.3 kbps. The 6.3 kpbs rate is preferably used. The g.729 codec describes a compression algorithm where voice is coded into 8-kbps streams.

If the G.723.1 codec is used at 6.3 kbps, the voice (payload) portion of the packet will be 24 bytes, representing 30 ms of voice. If the G.729 codec is used (at 8 kbps), the payload portion of the packet will be 20 bytes per 20 ms of voice.

Figure 4:
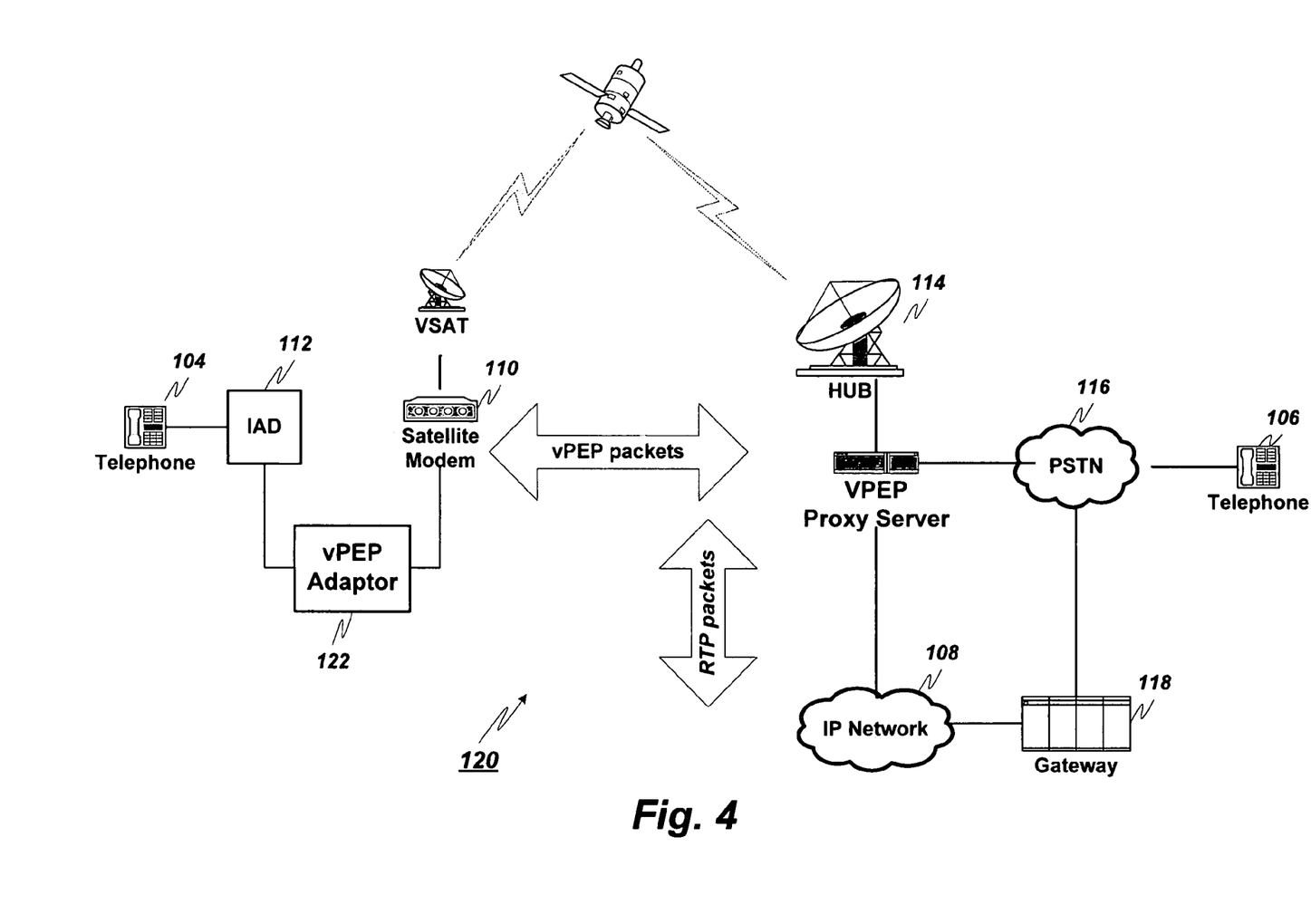
FIGS. 4-5 show communications frameworks according to embodiments of the present invention.
Figure 5:
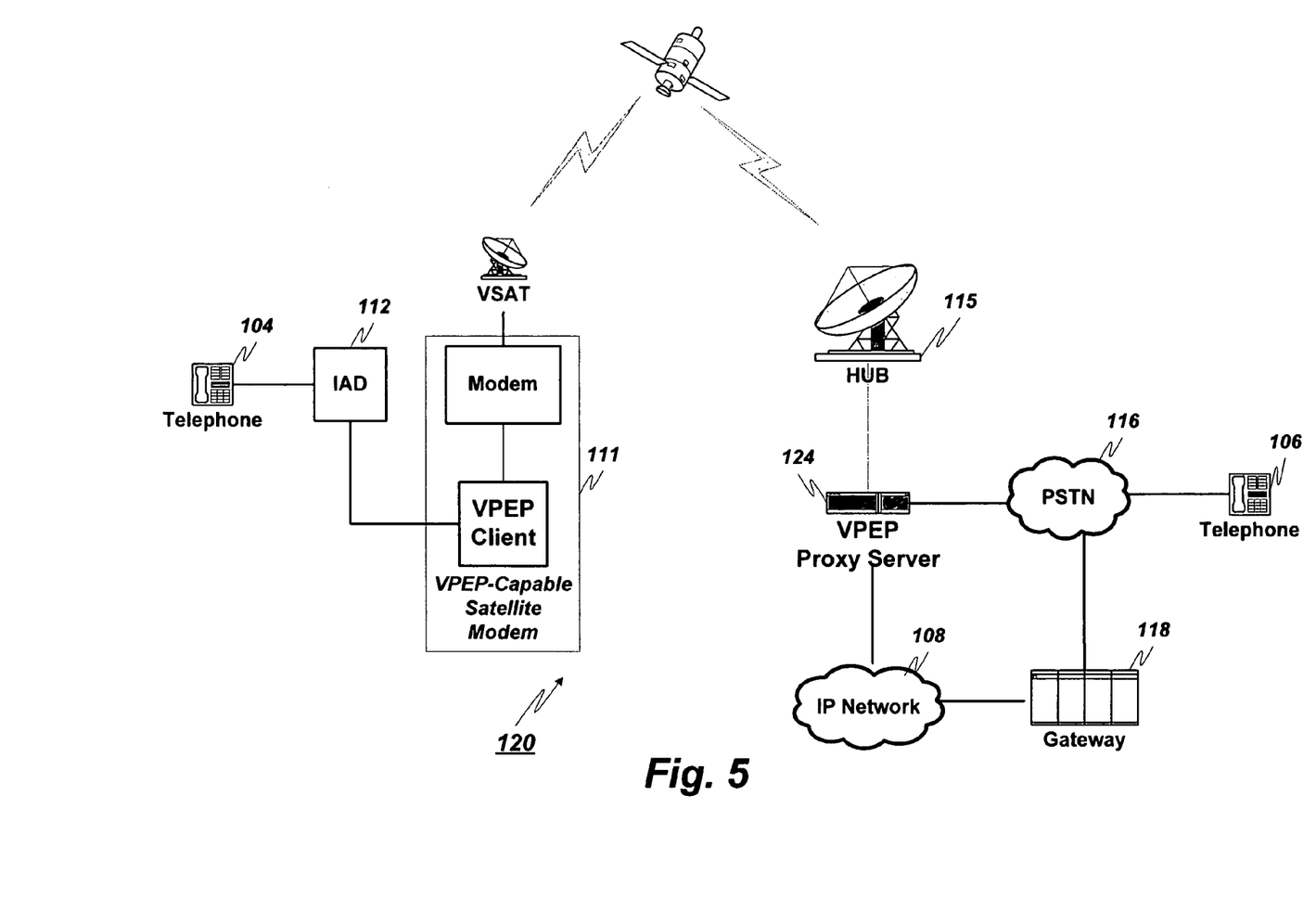

FIG. 4 shows a VoIP framework 120 according to embodiments of the present invention. As shown in the drawing, a VPEP (Voice Performance Enhancement Protocol) adaptor 122 is associated with the first telephone 104. More specifically, the VPEP adaptor 122 is connected to the IAD 112 and the satellite modem 110, so that signals between the IAD and the satellite modem can pass through (and be processed by) the VPEP adaptor. Although shown in the drawing as a separate component, the VPEP adaptor may be integrated into the satellite modem and/or into the IAD. FIG. 5 shows a VOIP framework in which the VPEP Adaptor is integral with the modem (to provide a VPEP-capable or VPEP-enabled satellite modem 111).

In presently preferred embodiments of the invention, a VPEP proxy server 124 is located on the other end of the satellite link 102, at the satellite hub or connected thereto. In view of the client-server (or client-client) nature of aspects of the operation of the invention, the adaptor 122 is also referred to as a client.

Figure 6:
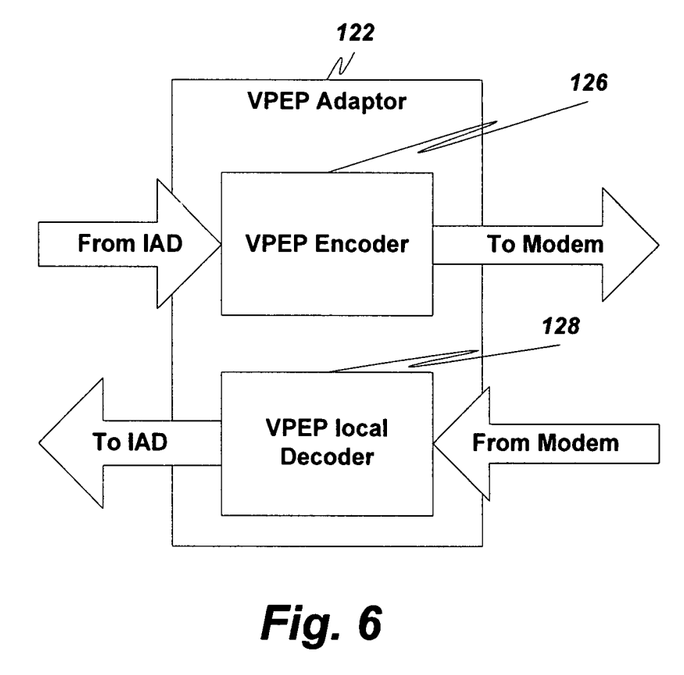
FIG. 6 shows the structure of an adaptor according to embodiments of the present invention.

FIG. 6 shows the logical structure of aspects of adaptor 122 according to embodiments of the present invention. Certain components such as power supply and the like are omitted from the drawings. As shown in FIG. 5, an adaptor 122 according to embodiments of the present invention includes a VPEP encoder 126 and a VPEP decoder 128. The encoder 126 receives data from an IAD, processes it, and provides the processed data to a modem. The VPEP decoder 128, on the other hand, receives data from a modem and provides it to an IAD.

Figure 7:
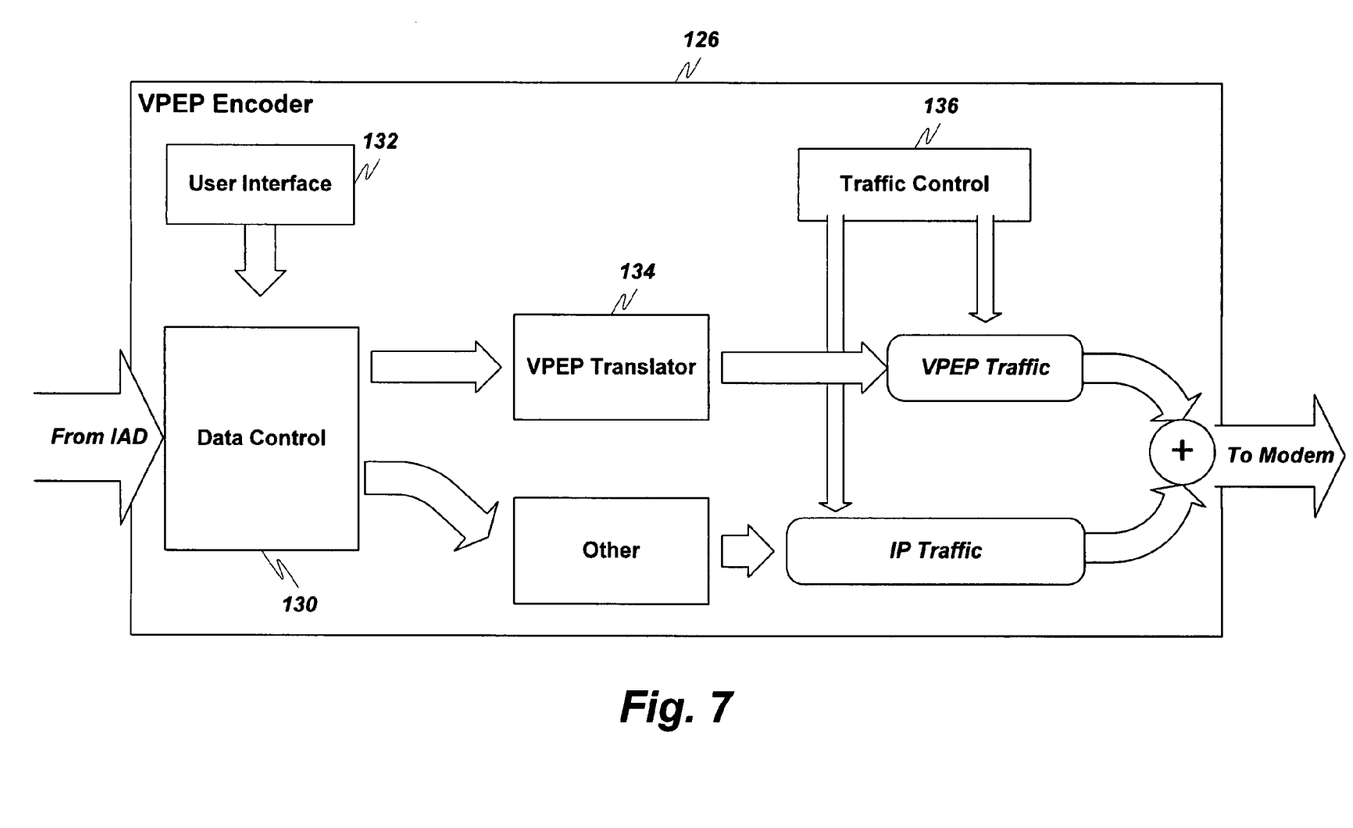
FIG. 7 shows the structure of an encoder according to embodiments of the present invention.

A VPEP encoder 126 according to embodiments of the present invention is shown in FIG. 7, and includes a data control 130 which analyzes data received (e.g., from the IAD). The data control 130 may be configurable by a user interface 132. The data control 130 may receive packetized voice data or other types of data (described below). If the data control 130 determines that an incoming IP packet contains voice data, that packet may be passed to the VPEP translation mechanism 134 for further processing (described below), otherwise the IP packet is passed through (as IP traffic).

Figure 8:
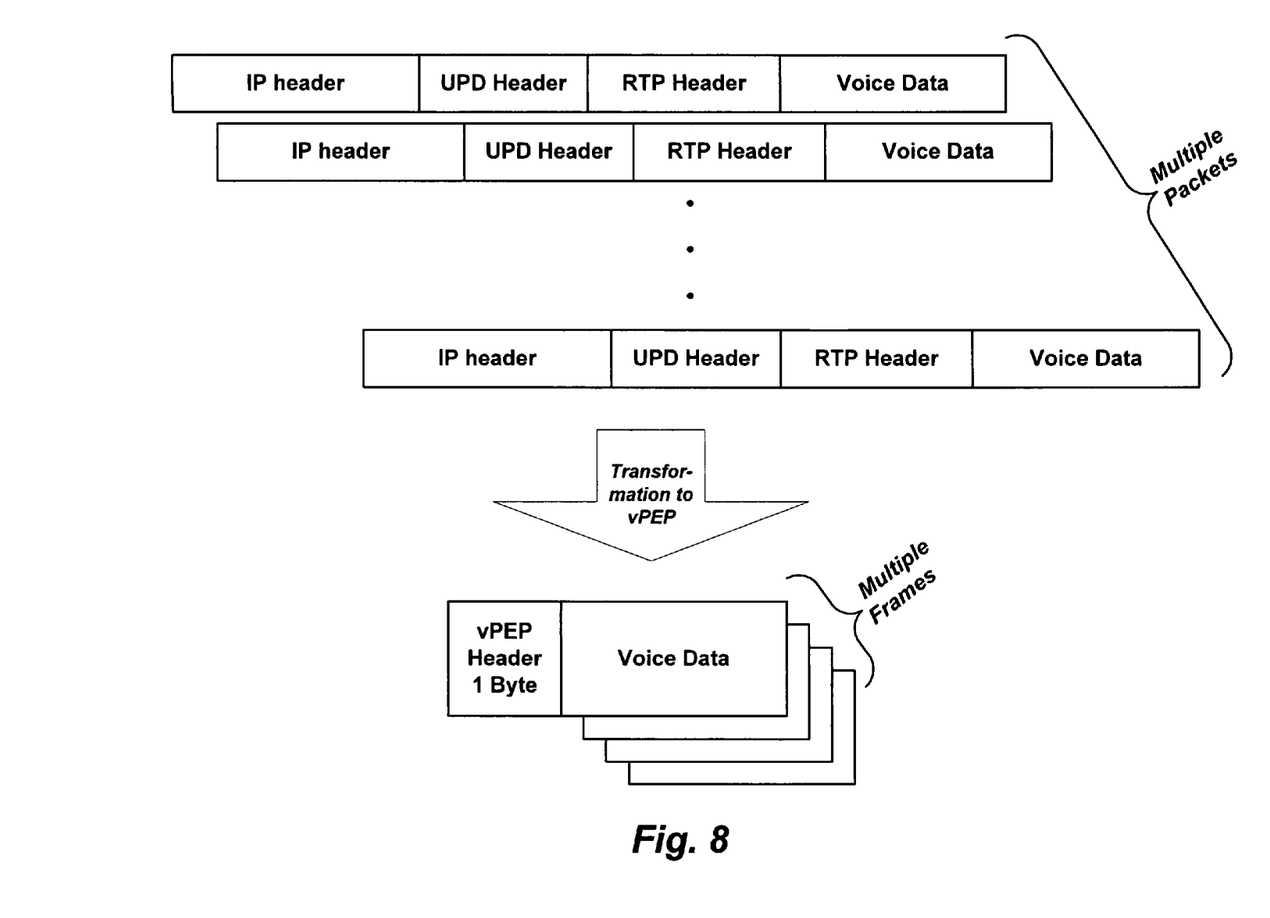
FIG. 8 shows the operation of and encoder according to embodiments of the present invention.

The VPEP translator 134 takes packets of voice data and produces corresponding VPEP packets. As shown in FIG. 8, one or more IP packets may be transformed to a single VPEP packet. The header information from the IP packets may be entirely removed and replaced by a VPEP header. The content of the VPEP header and the manner in which it is used are described below. The VPEP header may be only one byte, or it may be larger. In addition to removing the IP header information, the voice data from the IP packets may, in some embodiments, be further compressed before being put into the VPEP packets.

The VPEP traffic (i.e., in this case, the VPEP packets produced by the VPEP translation mechanism), are sent to the modem along with the IP traffic that was not processed by the VPEP translator.

Figure 9:
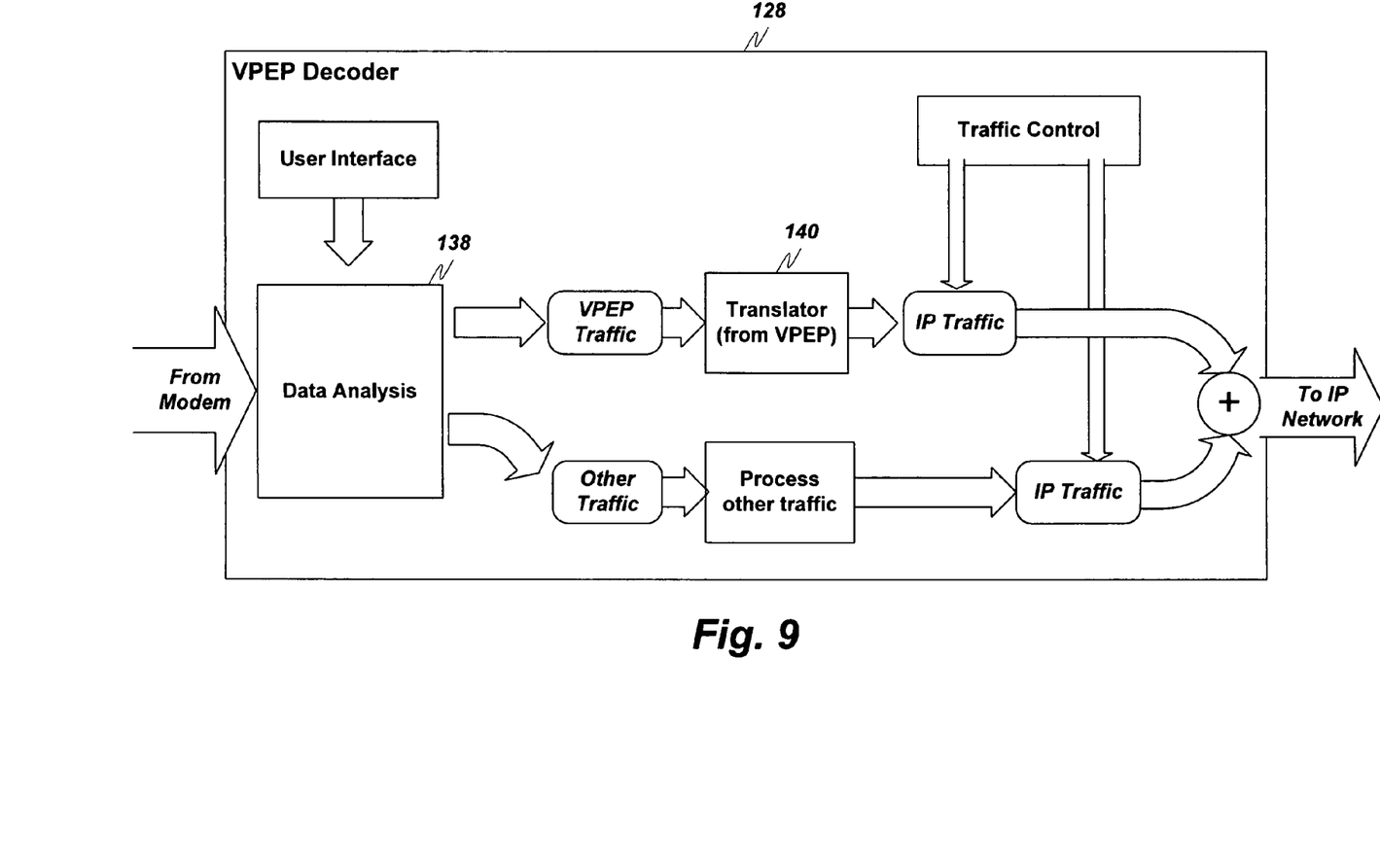
FIG. 9 shows a decoder according to embodiments of the present invention.
Figure 10:
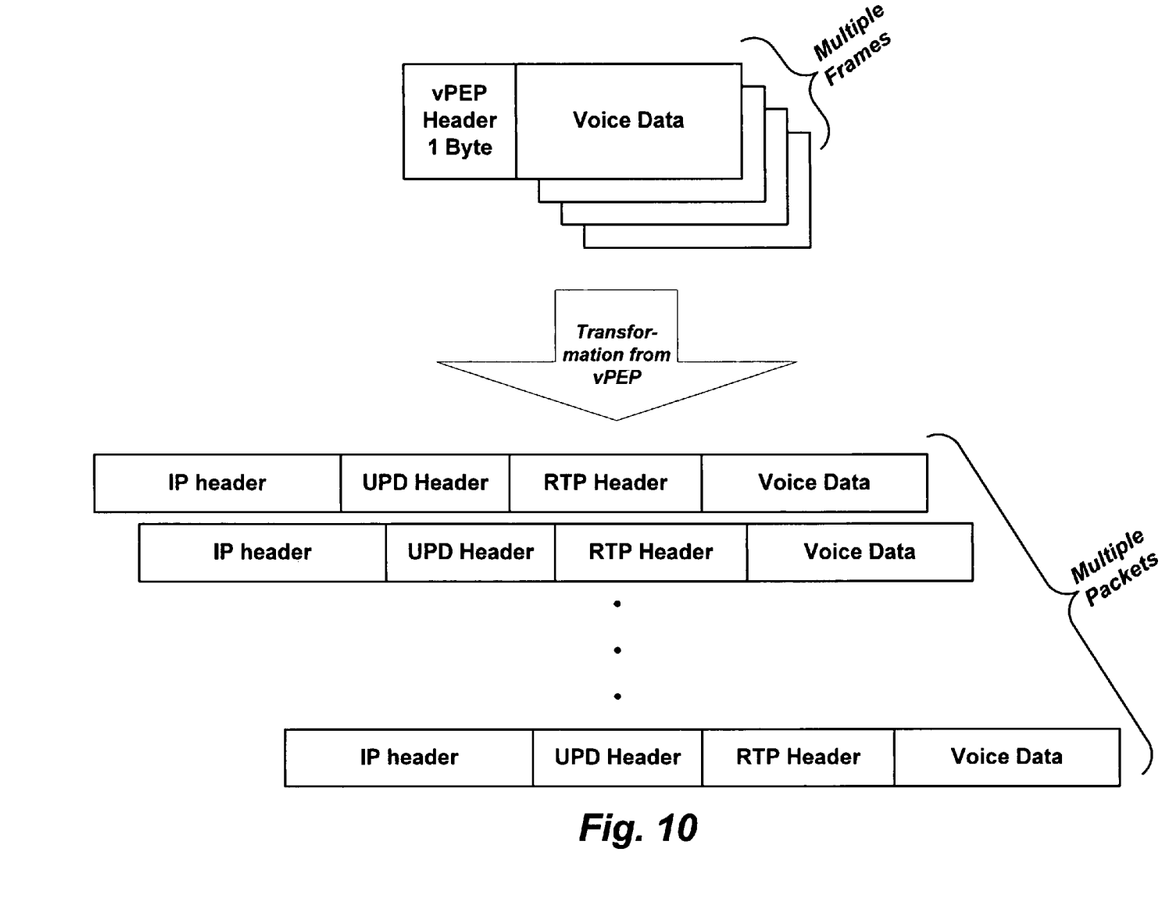
FIG. 10 shows the operation of a decoder according to embodiments of the present invention.

The VPEP decoder 128 receives VPEP and other communications from a modem and converts these to a stream of data that can be processed by the IAD or other device connected thereto. A VPEP decoder 128 according to embodiments of the present invention is shown in FIG. 9. A data analyzer 138 receives an inbound stream of packets (both IP and VPEP) (e.g., from a modem) and translates those packets back to a stream of IP traffic. A translator 140 transforms the VPEP packets from the inbound stream into IP packets. As shown in FIG. 10, the voice data in the VPEP packets are transformed back into IP voice data of the appropriate form, and that voice data are then re-packetized as IP packets with the original IP headers re-inserted.

A traffic control mechanism 136, if enabled, polices outbound data before they are sent to the modem. The traffic control mechanism 136 (when enabled) functions to determine the rate of transmission data flows present on the network in addition to voice traffic. The traffic control mechanism 136 analyses data transfer requirements for voice traffic and shapes the rate of transmission of non-real-time traffic (e.g., giving voice or VPEP packets higher priority than non-voice packets).

Figure 11:
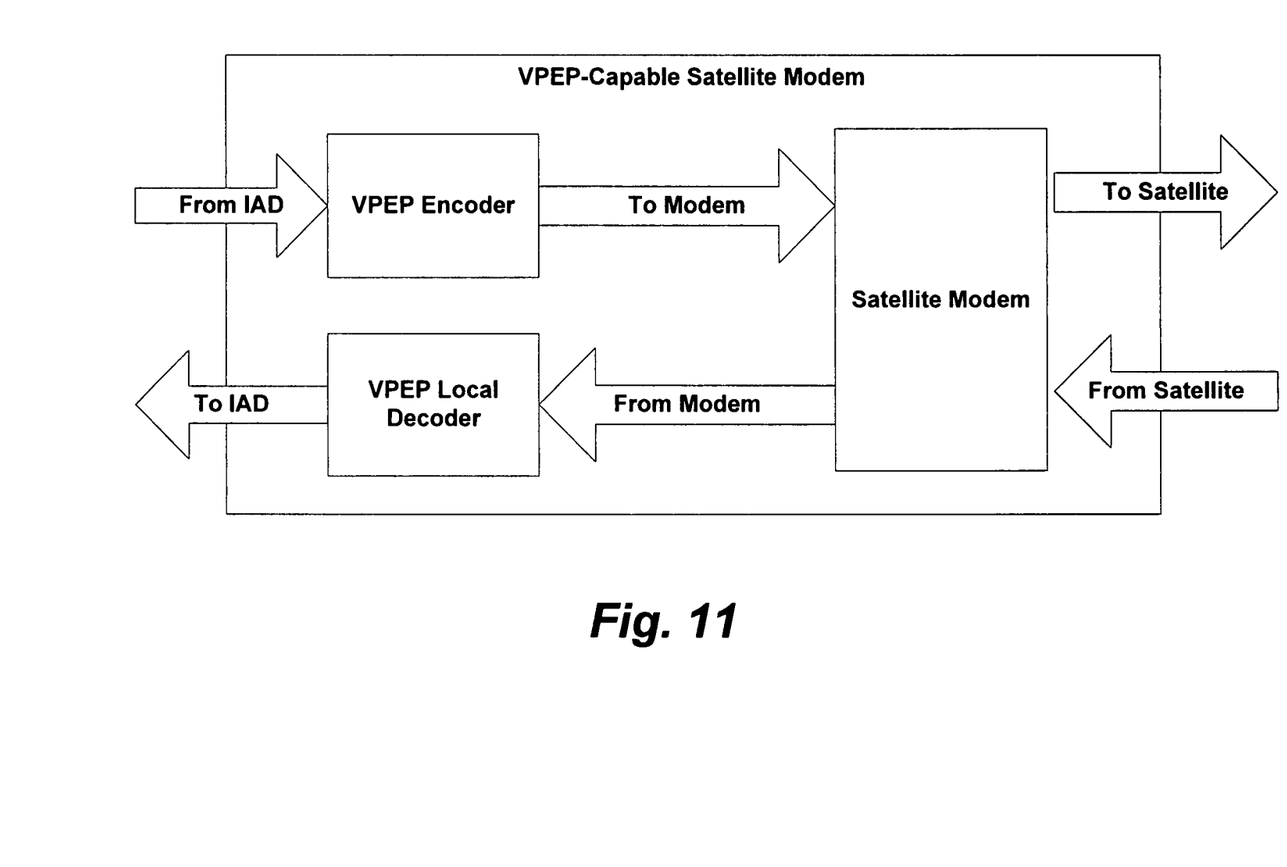
FIG. 11 shows a satellite modem incorporating an adaptor according to embodiments of the present invention.

FIG. 11 shows components of a VPEP adaptor integrated with a satellite modem to form a VPEP-capable (or VPEP-enabled) satellite modem.

If a VoIP call is being made to another VPEP-enabled phone system, the framework can be viewed (from the perspective of those two phones) as a client-client system. Each phone will be connected to a VPEP adaptor according to embodiments of the present invention. The phones will negotiate their own VPEP session which will allow them each to know what IP header information to add back to the packets when they are reconstructed.

In the case of a VPEP-enabled client phone to a non-VPEP-enabled phone, the VPEP proxy server 124 (in FIG. 4) is used to establish a VPEP session between the two phones. A VPEP proxy server, according to embodiments of the present invention, also includes a VPEP encoder 126 and decoder 128. Traffic from a non-VPEP-enabled phone that is to be transmitted via satellite is encoded using the encoder, and VPEP traffic that is received via satellite is decoded before being sent to the appropriate phone (via an IP or other network).

Figure 12:
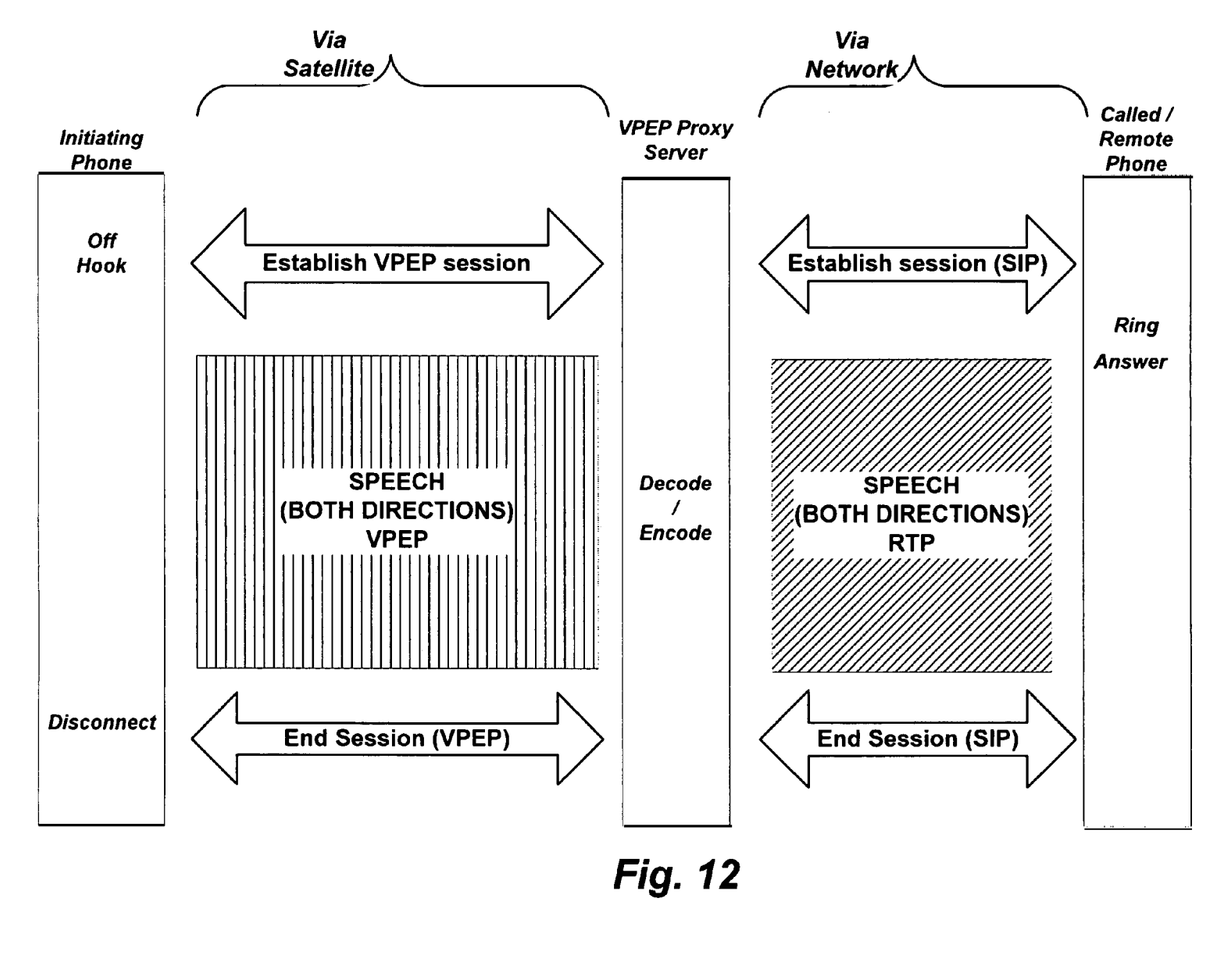
FIG. 12 shows exemplary operation of the present invention.

FIG. 12 depicts the operation of such a call. For the sake of this example, assume that that initiating phone is VPEP-enabled (i.e., it operates via a VPEP adaptor as shown in FIG. 4 or has a VPEP-enabled satellite modem as shown in FIG. 11). When the initiating phone goes off hook and dials a number for the remote phone, the VPEP client 122 tries to establish a VPEP session with a VPEP proxy server 124. Once such a session is established, the VPEP proxy server 124 then attempts to establish a session with the called/remote phone 106. The session between the proxy server 124 and the called phone 106 will be established using a protocol such as SIP. With the sessions established, the initiating phone communicates VPEP speech in both directions with the VPEP proxy server, and the proxy server communicates RTP or similar speech in both directions with the called phone. From the point of view of the called phone, it is conducting a call with the initiating phone, although the proxy server is actually masquerading as the initiating phone.

Thus, once the VPEP and SIP sessions are established, speech from the initiating phone is passed though the IAD 112 to the VPEP adaptor 122 (which may be in the satellite modem 111 or in a separate device). The speech is translated into VPEP traffic which is sent (with non-VPEP traffic) to the VPEP proxy server. The VPEP proxy server decodes the VPEP traffic, combines it with the non-VPEP traffic, and passes the traffic as RTP traffic to the called phone. RTP traffic from the called phone is converted by the VPEP proxy server into VPEP traffic and sent (via the satellite link) to the initiating phone. The VPEP traffic from the proxy server is decoded by the VPEP decoder in the VPEP adaptor and the decoded traffic is passed to the phone. If both the initiating and called phones are VPEP-enabled, the proxy server can be bypassed, and a VPEP session may be established directly between the phones. The VPEP-enabled devices can (through message contents) determine whether or not a proxy server may be bypassed. If the destination device acknowledges the receipt of a VPEP packet, then the originator will establish VPEP communication between devices directly. For communications between devices where IP heading information is needed, the devices can be configured to include the IP heading information in order to transverse the IP network.

The VPEP Header

In presently preferred embodiments of the invention, the VPEP packet includes one byte of heading information (shown in FIGS. 8 and 10). This byte contains one nibble (4 bits) representing an incrementing sequence number and a nibble (4 bits) representing a unique session id. This information, along with the MAC address, is used to determine session identity. In these embodiments a device may support a maximum of fifteen unique sessions. This number of sessions is considered sufficient for many applications of the present invention. Those skilled in the art will realize, however, that if more unique sessions are required, other encoding schemes or a larger VPEP header may be used.

Additionally, in some embodiments of the present invention, special packets are sent when the session id is determined to be null. These packets vary in size and structure depending on the messaging being conveyed. For example a DTMF (Dual Tone Multi-Frequency) event message consists of a special message describing that it is DTMF digit, along with the duration and amplitude of the digit.

Silence Suppression

Recall that classical PSTN-type telephone calls provide a dedicated circuit for a call's duration. The circuit is released when the call is disconnected by either party (by on-hook signals or the like). Calls may also be disconnected when either party detects no signal from the other party for some period of time. Since a VoIP telephone call does not have a dedicated or persistent circuit, various methods are employed to keep sessions active in the presence of unpredictable delays. One of these techniques is to send so-called "silence" or "comfort" messages between the parties even when no actual voice traffic is being sent. In addition to keeping the session between the parties active and thereby prevent it being terminated, these silence messages provide a level of comfort to users by providing a type of white noise that lets them know that the connection is still active. In typical VoIP systems, silence is transmitted as full IP packets with pre-determined payloads representing appropriate silence (i.e., white noise—the sounds of silence).

In yet another aspect of the present invention, in some embodiments, the VPEP encoder recognizes silence (e.g., in the VPEP translator 134), and encodes it as special silence (or comfort) streams represented by a single byte VPEP header which indicates to the far end that silence is being sent. In some embodiments of the present invention, an indication of the length of the silence is included. At the far end, i.e., at the VPEP proxy server, the VPEP silence packets are decoded into the appropriate number of IP silence packets and sent to the called party. In this manner, the VPEP proxy server spoofs far end silence and keeps the SIP session active. In like manner, the VPEP proxy server can send VPEP silence packets to the calling party, as needed.

In some present embodiments of the present invention, the vPEP Adapter/Modem 111 may send silence/comfort noise to the (same location) telephone 104 whenever there are no voice packets present to play. The vPEP proxy 124 may send silence/comfort noise to the non-vPEP capable device (i.e., PSTN Telephone) whenever there are no voice packets present to play in its direction. In this way the invention may perform ideal far-end silence suppression—each side is deriving its own silence and no silence traversing the satellite link.

Satellites generally use Constant Bit Rate (CBR) and sometimes Dedicated Access (DA) schemes to "guarantee bandwidth" on the return link (from subscriber to Satellite Hub). There are normally triggers (i.e., traffic on a given UDP port) as well as timeouts (i.e., no traffic on said port for some period of time) associated with the rules. Some embodiments of the present invention provide for a so-called "keep alive" mechanism that sends a very small packet out the specified UDP port in order to keep the CBR or DA access alive.

The following tables summarizes bandwidth and other advantages gained by use of the present invention. The data in the tables is based on an average of two bytes per VPEP header, which is only the case when there are more than fifteen active channels from any one site (as noted above, a presently preferred header size is one byte).

The data in the tables describes the transmission rates for the specific codecs at various speech frame sizes (milliseconds of speech per packet). For example, for the G.723.1 codec at 6.3 Kbps, a single frame consists of 30 milliseconds worth of speech (i.e., 24 bytes). With the IP overhead, the packet size increases to 78 bytes (MAC=14 bytes, IP=20 bytes, UDP=8 bytes, and RTP=12 bytes). Using embodiments of the present invention with VPEP, the packet size reduces to 40 bytes and the overhead (and therefore bandwidth use) reduces from 70% to 40%. Different rates of silence suppression achieve further reduction in bandwidth usage.

DTMF tones) that are to be sent from one phone to another. DTMF tones are the tones heard when pressing a button on a telephone, and may be used by a caller to access, e.g., voice mail, bank accounts or any other service that can be access via telephone.

Embodiments of the present invention handle special events as follows: The VPEP translator 134 recognizes packets containing DTMF tones and transmits special VPEP packets representing those tones. That is, for each possible DTMF tone, a particular VPEP packet is sent representing that tone. On the far end, the VPEP decoder recognizes special event VPEP packets and converts them to the appropriate IP packets having the appropriate tones. In this manner, special events are processed using minimal bandwidth and no loss. Similar processing occurs for special events from the called party.

Embodiments of the present invention support some or all of the following special events: DTMF/MF, silence content changes, FAX heading: and T38 or Relay.

In preferred embodiments of the present invention, all normal RTP voice packets contain a one-byte VPEP header (4-bit session ID, 4-bit sequence number). The rest of the packet contains the encoded payload—speech information.

|  | Compression Technique | | | | | | |
|---|---|---|---|---|---|---|---|
|  | G.723.1 | | | G.729 | | | G.711 |
| Frame Length (msec.) | 30 | 30 | 30 | 10 | 10 | 10 | 1 |
| Codec bit rate (Kbps) | 6.3 | 6.3 | 6.3 | 8 | 8 | 8 | 64 |
| Frame per packet | 1 | 2 | 4 | 1 | 2 | 4 | 20 |
| Packets per second | 33.3 | 16.7 | n/a | 100 | 50 | n/a | 50 |
| Payload size (bytes) | 24 | 48 | n/a | 10 | 20 | n/a | 160 |
| Packet size (in Bytes) with MAC of 14 bytes | 78 | 102 | n/a | 64 | 74 | n/a | 214 |
| Overhead % | 70 | 53 | n/a | 85% | 73% | n/a | 26% |
| Bandwidth at full rate (Kbps) | 20.8% | 13.7% | n/a | 51.2% | 29.6% | n/a | 85.6% |
| Packet size with VPEP | 40 | 64 | 112 | 26 | 36 | 56 | 176 |
| Overhead (%) | 40% | 25% | 14% | 61% | 44% | 29% | 9% |
| Bandwidth at full VPEP rate (Kbps) | 10.656 | 8.55 | 7.48 | 20.8 | 14.4 | 11.2 | 70.4 |

| Silence Suppression Rates | | | | | | | |
|---|---|---|---|---|---|---|---|
|  | Compression Technique | | | | | | |
|  | G.723.1 | | | G.729 | | | G.711 |
| Real silence suppression @ 15% | 9.86 | 7.67 | 6.56 | 19.92 | 13.44 | 10.12 | 61.04 |
| Ideal silence suppression @15% with VPEP | 9.06 | 7.27 | 6.36 | 17.68 | 12.24 | 9.52 | 59.84 |
| Real silence suppression @ 30% | 9.06 | 6.79 | 5.64 | 19.36 | 12.48 | 9.04 | 51.68 |
| Ideal silence suppression @ 30% with VPEP | 7.46 | 5.99 | 5.24 | 14.56 | 10.08 | 7.84 | 49.28 |
| Real silence suppression @ 50% | 7.99 | 5.61 | 4.41 | 18.40 | 11.20 | 7.60 | 39.20 |
| Ideal silence suppression @ 50% with VPEP | 5.33 | 4.28 | 3.74 | 10.40 | 7.20 | 5.60 | 35.20 |

Special Event Processing

Certain so-called special events may occur during a telephone call. These events include non-voice signals (such as Special events packet types begin with a sessionID of zero (sessionID=0). A VPEP packet starting with a session ID equal to zero indicates that special events are to follow. Following the first byte sessionID, is a four bit actual sessionID followed by the four bit sequence number (as in a normal VPEP packet). The next byte contains the special event type. The types are:

DTMF/MF/prompt tone generation/replication
Silence Packet event
Keep Alive event
Speech codec change event
Fax events (relay/t38)

EXAMPLES

DTMF Event

| 8 bit | 4 bit | 4 bit | 8 bit | 8 bit | 8 bit | 8 bit. |
|---|---|---|---|---|---|---|
| special event | sessionId | SeqNumber | DTMF TYPE | DTMF tone | DTMF amplitude | DTMF modulation. |

Silence Packet

Silence Packets can be Configured to be Sent as Continuous Events or When it Changes

| 8 bit special event | 4 bit sessionId | 4 bit SeqNumber | 8 bit Silence Packet | (variable) Silence CFN |
|---|---|---|---|---|

Thus are described performance enhancement protocol, systems, methods and devices.

While the term "voice" is used throughout to describe the data being transferred, those skilled in the art will realize that, unless otherwise specifically stated, "voice" it includes voice, video, text, and other real-time media, alone or in combination.

While aspects of the present invention are described with respect to certain codecs, these descriptions are merely exemplary, and those skilled in the art will realize that the present invention is applicable to any codec and is not to be limited by the particular exemplary codecs used for its description.

While the present invention has been described with respect to satellite transmission, these descriptions are exemplary, and are not intended to limit the scope of the invention. Those skilled in the art will realize that aspects of the present invention are applicable not just to satellites, but to any medium that operates according to the IP protocol.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A method of a near-end telephone device communicating with a far-end telephone device in a Voice-over-IP-based system via a proxy server, wherein an adaptor for a first communications protocol is associated with said near-end telephone device, said first communications protocol being distinct from a TCP/IP protocol, the method comprising:

(A) establishing a session with said proxy server using said first communications protocol, said session with said proxy server having a session identifier associated therewith, said session identifier being provided by said proxy server to identify said session;

(B) receiving, by said adaptor, first packets from the near-end telephone device, the first packets being formatted according to a second communications protocol and addressing the far-end telephone device, the second communications protocol being distinct from the first communications protocol, wherein the second communications protocol is the TCP/IP protocol, and wherein the first packets received from the near-end telephone device are TCP/IP packets, each of said first packets including IP header information, and wherein at least some of the TCP/IP packets received from the near-end telephone device comprise voice data;

(C) determining, by said adaptor, whether or not a packet of said first packets received from the near-end telephone device comprises voice data, and when a packet received from the near-end telephone device does not comprise voice data, sending said packet to the proxy server as an IP protocol packet, otherwise converting at least some of the TCP/IP packets that do comprise voice data to one or more packets of the first communications protocol, said converting including:

combining at least some information of multiple of said TCP/IP packets that comprise voice data into one packet of said first communications protocol, wherein the combining includes removing IP header information of said multiple TCP/IP packets that comprise voice data; and (D) sending the one or more packets of the first communications protocol to the proxy server, wherein packets of the first protocol include a header comprising said session identifier corresponding to said session established with said proxy server;

(E) receiving, by said adaptor, second packets from the proxy server, the second packets being formatted according to the first communications protocol, said second packets corresponding to second TCP/IP packets received by said proxy server from said far-end telephone device, said second TCP/IP packets addressing said near-end telephone device;

(F) converting, by said adaptor, at least some of the received second packets from the first communications protocol to multiple corresponding third TCP/IP packets, wherein at least one second packet of said first communications protocol is converted to multiple corresponding third TCP/IP packets that comprise voice data, and wherein IP header information not present in said at least one second packet of said first communications protocol is added to said multiple corresponding third TCP/IP packets, said third TCP/IP packets addressing said near-end telephone device; and (G) sending the multiple corresponding third TCP/IP packets to the near-end telephone device.

2. The method of claim 1 further comprising:

determining whether one or more TCP/IP packets received from the near-end telephone in (B) represent silence, and, based at least in part on said determining, sending to the proxy server an indication of said silence, said indication comprising one or more packets of the first communications protocol.

3. The method of claim 1 comprising:

determining whether one or more TCP/IP packets received from the near-end telephone represents a Dual Tone Multi-Frequency (DTMF) event, and, based at least in part on said determining, sending to the proxy server an event message indicative of said DTMF event, said event message comprising a single packet of the first communications protocol.

4. The method of claim 3 wherein the event message includes an indication of one or more of: (a) the DTMF tone, (b) the DTMF amplitude, and (c) the DTMF modulation.

5. The method of claim 1 wherein packets of the first communications protocol also include encoded payload.

6. The method of claim 1 wherein packets of the first communications protocol comprise a one-byte header forming a 4-bit session identifier and a 4-bit sequence number.

7. The method of claim 2 wherein said indication of silence includes an indication of the length of the silence.

8. The method of claim 1 wherein packets of the first communications protocol comprise a header forming session identifier and a sequence number.

9. A method of a near-end telephone device communicating with a far-end telephone device in a Voice-over-IP-based system via a proxy server, wherein an adaptor for a first communications protocol is associated with said near-end telephone device, said first communications protocol being distinct from a TCP/IP protocol, the method comprising:

(A) establishing a session with said proxy server using said first communications protocol, said session with said proxy server having a session identifier associated therewith, said session identifier being provided by said proxy server to identify said session;

(B) receiving, by said adaptor, first packets from the near-end telephone device, the first packets being formatted according to a second communications protocol and addressing the far-end telephone device, the second communications protocol being distinct from the first communications protocol, wherein the second communications protocol is the TCP/IP protocol, and wherein the first packets received from the near-end telephone device are TCP/IP packets, each of said first packets including IP header information, and wherein at least some of the TCP/IP packets received from the near-end telephone device comprise voice data;

(C)(1) determining, by said adaptor, whether or not a packet of said first packets received from the near-end telephone device comprises voice data, and when a packet received from the near-end telephone device does not comprise voice data, sending said packet to the proxy server as an IP protocol packet, otherwise converting at least some of the TCP/IP packets that do comprise voice data to one or more packets of the first communications protocol, said converting including:

combining at least some information of multiple of said TCP/IP packets that comprise voice data into one packet of said first communications protocol, wherein the combining includes removing IP header information of said multiple TCP/IP packets that comprise voice data; and (C)(2) determining whether one or more TCP/IP packets received from the near-end telephone in (B) represent silence, and, based at least in part on said determining, sending to the proxy server an indication of said silence, said indication comprising one or more packets of the first communications protocol; and (C)(3) determining whether one or more TCP/IP packets received from the near-end telephone represents a Dual Tone Multi-Frequency (DTMF) event, and, based at least in part on said determining, sending to the proxy server an event message indicative of said DTMF event, said event message comprising a single packet of the first communications protocol; and (D) sending the one or more packets of the first communications protocol to the proxy server, wherein packets of the first protocol include a header comprising said session identifier corresponding to said session established with said proxy server;

(E) receiving, by said adaptor, second packets from the proxy server, the second packets being formatted according to the first communications protocol, said second packets corresponding to second TCP/IP packets received by said proxy server from said far-end telephone device, said second TCP/IP packets addressing said near-end telephone device;

(F) converting, by said adaptor, at least some of the received second packets from the first communications protocol to multiple corresponding third TCP/IP packets, wherein at least one second packet of said first communications protocol is converted to multiple corresponding third TCP/IP packets that comprise voice data, and wherein IP header information not present in said at least one second packet of said first communications protocol is added to said multiple corresponding third TCP/IP packets, said third TCP/IP packets addressing said near-end telephone device; and (G) sending the multiple corresponding third TCP/IP packets to the near-end telephone device.

10. The method of claim 9 wherein the event message includes an indication of one or more of: (a) the DTMF tone, (b) the DTMF amplitude, and (c) the DTMF modulation.

11. The method of claim 9 wherein packets of the first communications protocol also include encoded payload.

12. The method of claim 9 wherein packets of the first communications protocol comprise a one-byte header forming a 4-bit session identifier and a 4-bit sequence number.

13. The method of claim 9 wherein said indication of silence includes an indication of the length of the silence.

14. A method of a near-end telephone device communicating with a far-end telephone device in a Voice-over-IP-based system via a proxy server, wherein an adaptor for a first communications protocol is associated with said near-end telephone device, said first communications protocol being distinct from a TCP/IP protocol, the method comprising:

(A) establishing a session with said proxy server using said first communications protocol, said session with said proxy server having a session identifier associated therewith, said session identifier being provided by said proxy server to identify said session;

(B) receiving, by said adaptor, first packets from the near-end telephone device, the first packets being formatted according to a second communications protocol and addressing the far-end telephone device, the second communications protocol being distinct from the first communications protocol, wherein the second communications protocol is the TCP/IP protocol, and wherein the first packets received from the near-end telephone device are TCP/IP packets, each of said first packets including IP header information, and wherein at least some of the TCP/IP packets received from the near-end telephone device comprise voice data;

(C) determining, by said adaptor, whether or not a packet of said first packets received from the near-end telephone device comprises voice data, and when a packet received from the near-end telephone device does not comprise voice data, sending said packet to the proxy server as an IP protocol packet, otherwise converting at least some of the TCP/IP packets that do comprise voice data to one or more packets of the first communications protocol, said converting including:

combining at least some information of multiple of said TCP/IP packets that comprise voice data into one packet of said first communications protocol, wherein the combining includes removing IP header information of said multiple TCP/IP packets that comprise voice data; and (D) sending the one or more packets of the first communications protocol to the proxy server, wherein packets of the first protocol include a header comprising said session identifier corresponding to said session established with said proxy server;

(E) receiving, by said adaptor, second packets from the proxy server, the second packets being formatted according to the first communications protocol, said second packets corresponding to second TCP/IP packets received by said proxy server from said far-end telephone device, said second TCP/IP packets addressing said near-end telephone device;

(F) converting, by said adaptor, at least some of the received second packets from the first communications protocol to multiple corresponding third TCP/IP packets, wherein at least one second packet of said first communications protocol is converted to multiple corresponding third TCP/IP packets that comprise voice data, and wherein IP header information not present in said at least one second packet of said first communications protocol is added to said multiple corresponding third TCP/IP packets, said third TCP/IP packets addressing said near-end telephone device; and (G) sending the multiple corresponding third TCP/IP packets to the near-end telephone device, wherein packets of the first communications protocol also include encoded payload, and wherein packets of the first communications protocol comprise a header forming a session identifier and a sequence number.

15. The method of claim 14 wherein packets of the first communications protocol comprise a one-byte header forming a 4-bit session identifier and a 46-bit sequence number.

16. A method of a near-end telephone device communicating with a far-end telephone device in a Voice-over-IP-based system via a proxy server, wherein an adaptor for a first communications protocol is associated with said near-end telephone device, said first communications protocol being distinct from a TCP/IP protocol, the method comprising:

(A) establishing a session with said proxy server using said first communications protocol, said session with said proxy server having a session identifier associated therewith, said session identifier being provided by said proxy server to identify said session;

(B) receiving, by said adaptor, first packets from the near-end telephone device, the first packets being formatted according to a second communications protocol and addressing the far-end telephone device, the second communications protocol being distinct from the first communications protocol, wherein the second communications protocol is the TCP/IP protocol, and wherein the first packets received from the near-end telephone device are TCP/IP packets, each of said first packets including IP header information, and wherein at least some of the TCP/IP packets received from the near-end telephone device comprise voice data;

(C) determining, by said adaptor, whether or not a packet of said first packets received from the near-end telephone device comprises voice data, and when a packet received from the near-end telephone device does not comprise voice data, sending said packet to the proxy server as an IP protocol packet, otherwise converting at least some of the TCP/IP packets that do comprise voice data to one or more packets of the first communications protocol, said converting including:

combining at least some information of multiple of said TCP/IP packets that comprise voice data into one packet of said first communications protocol, wherein the combining includes removing IP header information of said multiple TCP/IP packets that comprise voice data; and (D) sending the one or more packets of the first communications protocol to the proxy server, wherein packets of the first protocol include a header comprising said session identifier corresponding to said session established with said proxy server;

(E) receiving, by said adaptor, second packets from the proxy server, the second packets being formatted according to the first communications protocol, said second packets corresponding to second TCP/IP packets received by said proxy server from said far-end telephone device, said second TCP/IP packets addressing said near-end telephone device;

(F) converting, by said adaptor, at least some of the received second packets from the first communications protocol to multiple corresponding third TCP/IP packets, wherein at least one second packet of said first communications protocol is converted to multiple corresponding third TCP/IP packets that comprise voice data, and wherein IP header information not present in said at least one second packet of said first communications protocol is added to said multiple corresponding third TCP/IP packets, said third TCP/IP packets addressing said near-end telephone device; and (G) sending the multiple corresponding third TCP/IP packets to the near-end telephone device, wherein packets of the first communications protocol comprise a header forming a session identifier and a sequence number.

17. The method of claim 16 wherein the header comprises a one-byte header forming a 4-bit session identifier and a 4-bit sequence number.

18. The method of claim 16 further comprising:

determining whether one or more TCP/IP packets received from the near-end telephone in (B) represent silence, and, based at least in part on said determining, sending to the proxy server an indication of said silence, said indication comprising one or more packets of the first communications protocol.

19. The method of claim 18 wherein said indication of silence includes an indication of the length of the silence.

20. The method of claim 16 comprising:

determining whether one or more TCP/IP packets received from the near-end telephone represents a Dual Tone Multi-Frequency (DTMF) event, and, based at least in part on said determining, sending to the proxy server an event message indicative of said DTMF event, said event message comprising a single packet of the first communications protocol.

21. The method of claim 18 wherein the event message includes an indication of one or more of: (a) the DTMF tone, (b) the DTMF amplitude, and (c) the DTMF modulation.

22. The method of claim 16 wherein packets of the first communications protocol also include encoded payload.

* * * * *